(No Model.)  3 Sheets—Sheet 1.

G. L. JARRETT.
ADJUSTABLE AUTOMATIC CONVEYER AND BOLTING REEL.

No. 405,841.  Patented June 25, 1889.

Witnesses:
C. M. Stiles
M. P. Smith

Inventor:
George L. Jarrett,
By Thomas G. Orwig, Atty.

(No Model.) 3 Sheets—Sheet 2.
G. L. JARRETT.
ADJUSTABLE AUTOMATIC CONVEYER AND BOLTING REEL.
No. 405,841. Patented June 25, 1889.
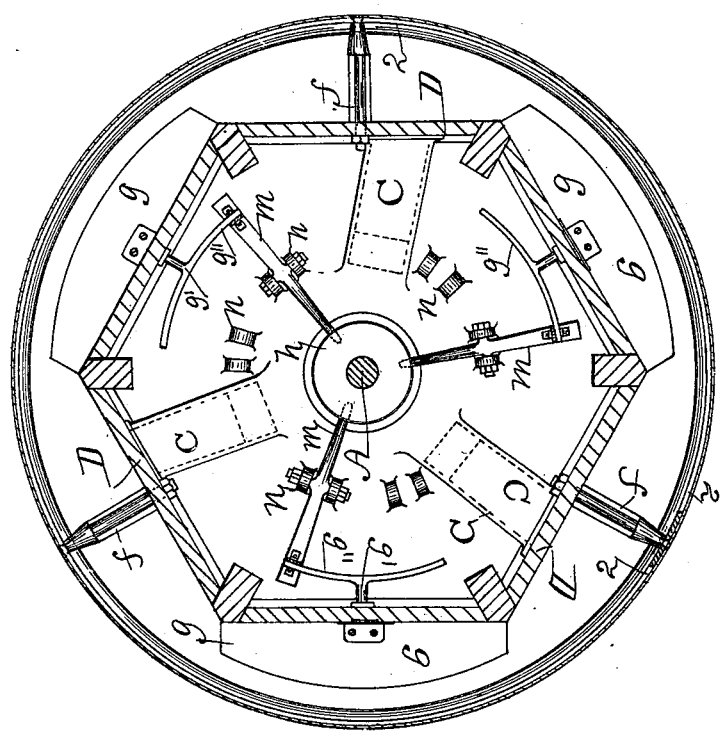
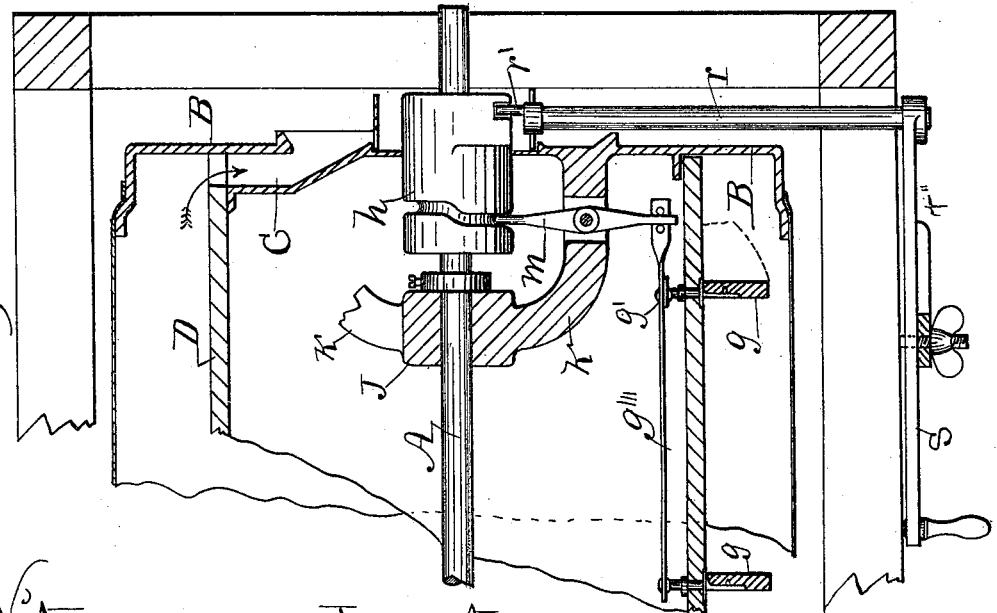
Witnesses: C. M. Stiles, M. P. Smith
Inventor: George L. Jarrett, By Thomas G. Orwig, Atty.

(No Model.) 3 Sheets—Sheet 3.

G. L. JARRETT.
ADJUSTABLE AUTOMATIC CONVEYER AND BOLTING REEL.

No. 405,841. Patented June 25, 1889.

Witnesses:
C. M. Stiles
M. P. Smith

Inventor:
George L. Jarrett
By Thomas G. Orwig, Atty.

UNITED STATES PATENT OFFICE.

GEORGE L. JARRETT, OF DES MOINES, IOWA.

ADJUSTABLE AUTOMATIC CONVEYER AND BOLTING-REEL.

SPECIFICATION forming part of Letters Patent No. 405,841, dated June 25, 1889.

Application filed October 30, 1888. Serial No. 289,530. (No model.)

*To all whom it may concern:*

Be it known that I, GEORGE L. JARRETT, a citizen of the United States of America, and a resident of Des Moines, in the county of Polk and State of Iowa, have invented an Adjustable Automatic Conveyer and Bolting-Reel, of which the following is a specification.

My object is to convey the product of the mill through a level and vertically-rotating bolting-reel in such a manner that the ground grain will be thoroughly stirred and moved as required to separate the flour from the bran and to drop the flour all along the entire length of the reel into a conveyer under the reel, to advance the bran and discharge it at the end of the reel, and to govern the length of time that the matter is subjected to the action of the reel.

My invention consists in the construction and combination of adjustable stirrers and deflectors, and mechanism for operating them within a reel having open passage-ways at one of its ends extending from its circumference to a chute at its center, as hereinafter set forth, pointed out in my claims, and illustrated in the accompanying drawings, in which—

Figure 1:
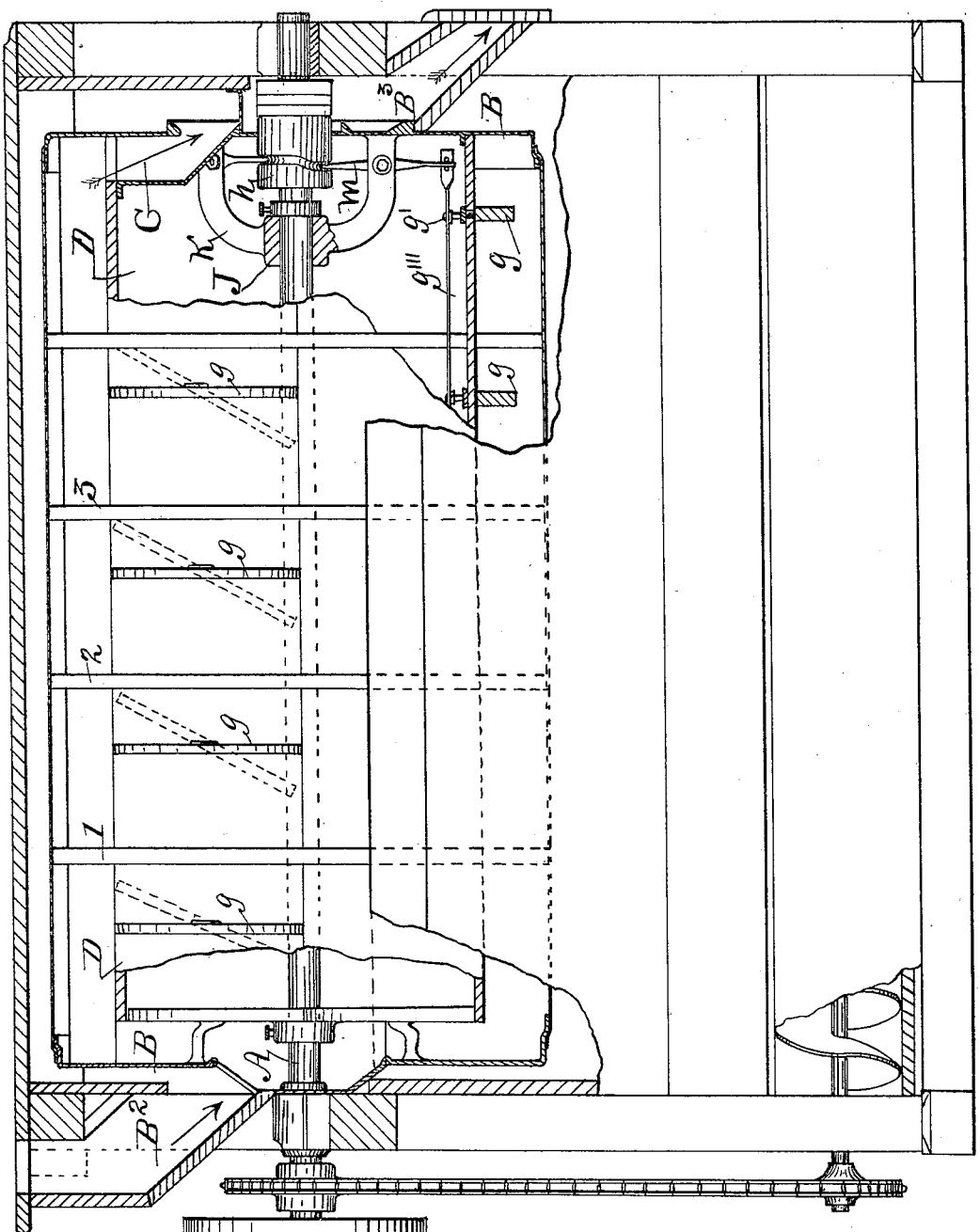
Figure 5:
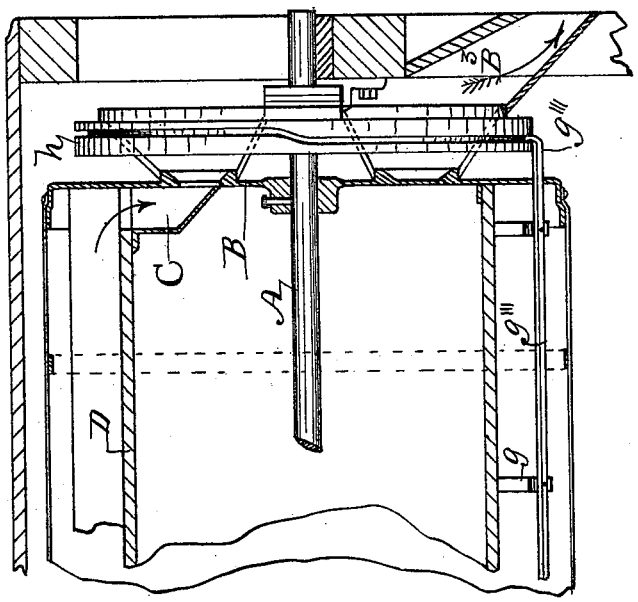
Figure 4:
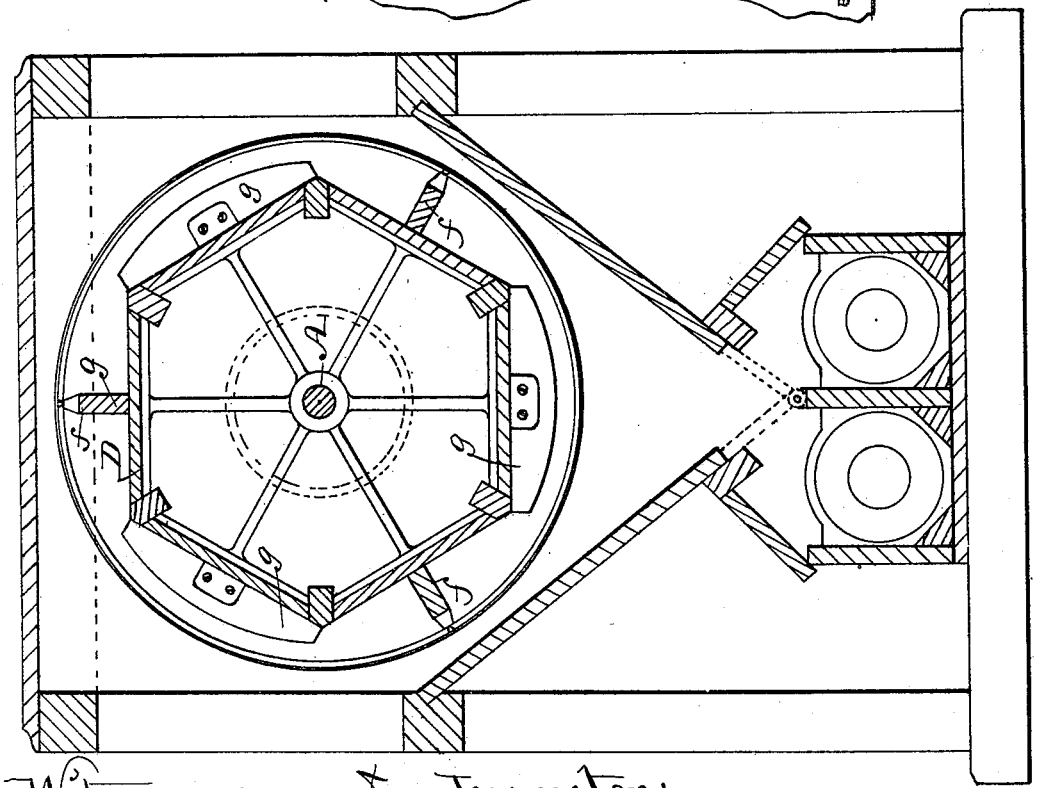

Figure 1 is a side view of my machine, from which parts are broken away to show the construction of the operating mechanism. Fig. 2 is a sectional view through a horizontal plane, showing a device for adjusting the conveyers in the reel. Fig. 3 is a sectional view of the reel through a vertical plane. Fig. 4 is a vertical and transverse sectional view of the complete machine. Fig. 5 is a sectional view of the reel, showing a modified form of the mechanism for adjusting the conveyers.

A is the shaft of a reel rotating in bearings fixed to the ends of a suitable frame and support.

B are the ends of a cylindrical frame in concentric position with the shaft and fastened thereto to rotate therewith.

$B^2$ is an inlet through which the products of the mill enter the reel continuously through openings in its head end at each revolution of the reel.

$B^3$ is a chute through which the bran is discharged from the machine as it falls from the end of the reel.

C are open-ended pockets or passage-ways connected with the tail end of the reel in such a manner that every time they reach a vertical position above the shaft A they will allow bran to fall through and into the chute $B^3$.

D is a closed cylinder, fixed to the shaft A and the ends B of the reel, to rotate therewith. Nos. 1 2 3 are circular frames or rings, fixed in concentric position with the shaft A and ends B by means of posts *f* and screw-bolts passed through from the inside of the cylinder D, or in any suitable way, as required, to support the bolting-cloth that extends from one end B to the other. The cylinder is polygonal, and *g* are stirrers pivoted to alternate sides on the surface of the cylinder. Their shafts *g'* project inside of the cylinder and have arms *g''* that extend at right angles, which arms are connected with reciprocating rods *g'''* in such a manner that they can be set at any angle desired on the surface of the cylinder by means of the rod, and also moved at each revolution of the reel by the motions of the rods, so that the simultaneous motions of all the stirrers connected with a rod will aid in stirring the ground grain as required to aid in separating the flour from the bran and conveying the matter from the head toward the tail of the reel. Each stirrer *g*, as it passes from the under side of the reel toward the top, will carry some of the material upward, and as it descends it will serve as a deflector to direct it toward the tail end, and those at the tail end, after the flour has fallen through the bolting-cloth into a conveyer below, will direct the bran into the passage-ways C, to be discharged through the chute $B^3$.

*h* (shown in Figs. 1 and 2) is a grooved cam adjustably fastened to the shaft A. J is a hub that has curved arms *k* and is fixed to the same shaft.

*m* are levers pivoted to the ends of the arms and flexibly connected with the rods *g'''* in such a manner that their free ends will extend into the groove of the cam *h*, to be vibrated thereby at each revolution of the cam and reel, as required to actuate the rods and operate the stirrers *g*. By making more lateral bends in the cam-groove the stirring will be increased. By making less bends it will be diminished.

In Fig. 3 the shafts *g'* of the stirrers have arms projecting in opposite directions, so that the movements of the stirrers can be reversed by changing the connection of each lever m from one arm to another.

n are bearings formed integral with the end B to support the levers m, that must also be changed in position when their connection with the stirrers is changed, as required to adapt the reel to be rotated to the right or left.

r is a rotating shaft that has a crank-pin r' on its end in an eccentric position relative to the axis of the shaft that extends into a perforation in the sliding grooved cam h. r'' is a crank on the end of the shaft.

s is a bolt, by means of which the crank and shaft and cam are retained stationary. By turning the crank and shaft the cam can be readily moved longitudinally, as required, to set the stirrers g at different inclinations for the purpose of regulating the movement of the ground grain faster or slower in its passage from the head end of the reel to the tail end.

In Fig. 5 the levers m are dispensed with by using a grooved cam-wheel of larger diameter and shaping the ends of the rods g''' so as to allow them to enter the groove in the periphery of the wheel.

From the foregoing description of the construction and function of each element the unitary actions of all the parts and the practical operation of the complete machine will be readily understood by millers.

I claim as my invention—

1. The stirrers g, having arms on the ends of their shafts, in combination with the cylinder D and reciprocating rods g'', for the purpose stated.

2. The combination of the grooved cam h, the shaft A, the levers m, the rods g''', and the stirrers g, and a reel to operate in the manner set forth, for moving the stirrers at each revolution of the reel in the manner set forth, for the purposes stated.

3. The shaft r, having a crank-pin r', in combination with the grooved cam h, for the purpose of operating the cam on the shaft A in the manner set forth, for the purposes stated.

4. A reel having integral open-ended pockets on one of its ends, a cylinder fixed in the reel and provided with series of pivoted deflectors g on its surface, arms on the ends of the deflector-shafts, and reciprocating rods connected with said arms and with a cam-wheel on the reel-shaft, arranged and combined with a case to operate in the manner set forth, for the purposes stated.

GEORGE L. JARRETT.

Witnesses:
GARDNER V. WRIGHT,
THOMAS G. ORWIG.